(12) United States Patent
Morgenstern et al.

(10) Patent No.: US 10,884,950 B2
(45) Date of Patent: Jan. 5, 2021

(54) IMPORTANCE BASED PAGE REPLACEMENT

(71) Applicant: INTERNATIONAL BUSINESS MACHINES CORPORATION, Armonk, NY (US)

(72) Inventors: Harris M. Morgenstern, Poughkeepsie, NY (US); Horst Sinram, Boeblingen (DE); Elpida Tzortzatos, Poughkeepsie, NY (US); Dieter Wellerdiek, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/155,525

(22) Filed: May 16, 2016

(65) Prior Publication Data

US 2017/0329722 A1    Nov. 16, 2017

(51) Int. Cl.
  *G06F 12/12*   (2016.01)
  *G06F 12/126*  (2016.01)
  *G06F 12/08*   (2016.01)

(52) U.S. Cl.
  CPC ............ *G06F 12/126* (2013.01); *G06F 12/08* (2013.01)

(58) Field of Classification Search
  None
  See application file for complete search history.

(56) References Cited

U.S. PATENT DOCUMENTS

| | | | |
|---|---|---|---|
| 5,493,663 A | 2/1996 | Parikh et al. | |
| 7,369,135 B2 | 5/2008 | Abdalla et al. | |
| 2004/0068627 A1* | 4/2004 | Sechrest | G06F 12/121 711/158 |
| 2007/0168638 A1* | 7/2007 | Hepkin | G06F 12/121 711/203 |
| 2008/0040554 A1* | 2/2008 | Zhao | G06F 12/126 711/133 |

(Continued)

FOREIGN PATENT DOCUMENTS

KR    1020150094205 A  *  8/2015  ............. G06F 12/08

OTHER PUBLICATIONS

Translation of KR1020150094205A; published Aug. 19, 2015; translation obtained Jun. 12, 2017.*

(Continued)

*Primary Examiner* — William B Partridge
*Assistant Examiner* — Eric T Loonan
(74) *Attorney, Agent, or Firm* — Heslin Rothenberg Farley & Mesiti P.C.; William A. Kinnaman Esq.

(57) ABSTRACT

Memory management is provided which includes a page replacement process managed by a storage manager and a workload manager. The page replacement process swaps out the content associated with a frame of physical memory to an auxiliary storage in order to provide a free frame. The memory management process includes: determining that the physical memory runs out of free frames; providing priority information from the workload manager to the storage manager, the priority information indicating the priority or business relevance of a certain process; selecting one or more pages to be swapped to the auxiliary storage based on the priority information; and swapping out the contents of the one or more selected pages to the auxiliary storage.

11 Claims, 2 Drawing Sheets

(56) References Cited

U.S. PATENT DOCUMENTS

| | | | |
|---|---|---|---|
| 2009/0025006 A1* | 1/2009 | Waldspurger | G06F 9/5016 718/104 |
| 2011/0154357 A1* | 6/2011 | Wellerdiek | G06F 9/505 718/105 |
| 2013/0262905 A1* | 10/2013 | Yamauchi | G06F 11/3062 713/340 |
| 2014/0195771 A1 | 7/2014 | Adderly et al. | |
| 2015/0033038 A1 | 1/2015 | Goss et al. | |
| 2015/0095919 A1 | 4/2015 | Vincent et al. | |
| 2016/0098203 A1* | 4/2016 | Chang | G06F 12/08 711/156 |

OTHER PUBLICATIONS

Anderson, HA, "Least Likely to be Serviced Page Replacement Algorithm," IBM Technical Disclosure Bulletin 12-75, p. 2378-2380, Dec. 1, 1975, 3 pages.*

Anderson, HA, "Least Likely to be Serviced Page Replacement Algorithm," IBM Technical Disclosure Bulletin 12-75, p. 2378-2380, Dec. 1, 1975, 3 pages (Year: 1975).*

Daula et al., "A Throughput Analysis on Page Replacement Algorithms in Cache Memory Management," International Journal of Engineering Research and Applications (IJERA), vol. 2, Issue 2, pp. 126-130 (Mar.-Apr. 2012).

Rathod et al., "A Survey on Page Replacement Algorithms in Linux," International Journal of Engineering Research and Applications (IJERA), vol. 3, Issue 3, pp. 1397-1401 (May-Jun. 2013).

* cited by examiner

IMPORTANCE BASED PAGE REPLACEMENT

BACKGROUND

The present invention relates to page replacement methods. More specifically, the present document relates to a method for selecting a candidate for page replacement based on information regarding the priority and or business importance of the process, the respective page to be swapped is related to.

SUMMARY

In one or more aspects, a computer-implemented method is provided herein for memory management. The memory management includes a page replacement process managed by a storage manager and a workload manager. The page replacement process swaps out the content associated with a frame of physical memory to an auxiliary storage in order to provide a free frame. The method includes: determining that the physical memory runs out of free frames; providing priority information for the workload manager to the storage manager, the priority information indicating the priority or business relevance of a certain process; selecting one or more pages to be swapped to the auxiliary storage based on the priority information; and swapping out the content of the one or more selected pages to the auxiliary storage.

In another aspect, a computer system is provided for memory management. The computer system includes a memory; and a processor communicatively coupled to the memory. The computer system performs a method comprising: determining that a physical memory runs out of free frames, wherein the memory management includes a page replacement process managed by a storage manager and a workload manager, the page replacement process swapping out the content associated with a frame of the physical memory to an auxiliary storage in order to provide a free frame; providing priority information from the workload manager to the storage manager, the priority information indicating the priority or business relevance of a certain process; selecting one or more pages to be swapped out to the auxiliary storage based on the priority information; and swapping out the content of the one or more selected pages to the auxiliary storage.

In a further aspect, a computer program product for memory management is provided. The computer program product includes a computer readable storage medium having program instructions embodied therewith, the program instructions being executable by a processor to perform a method comprising: determining that a physical memory runs out of free frames, wherein the memory management includes a page replacement process managed by a storage manager and a workload manager, the page replacement process swapping out the content associated with a frame of the physical memory to an auxiliary storage in order to provide a free frame; providing priority information from the workload manager to the storage manager, the priority information indicating the priority or business relevance of a certain process; selecting one or more pages to be swapped to the auxiliary storage based on the priority information; and swapping out the content of the one or more selected pages to the auxiliary storage.

Additional features and advantages are realized through the techniques of the present invention. Other embodiments and aspects of the invention are described in detail herein and are considered part of the claimed invention.

BRIEF DESCRIPTION OF THE DRAWINGS

In the following description, one or more embodiments of the present invention are explained in greater detail, by way of example only, with reference to the drawings in which.

DETAILED DESCRIPTION

Figure 1:
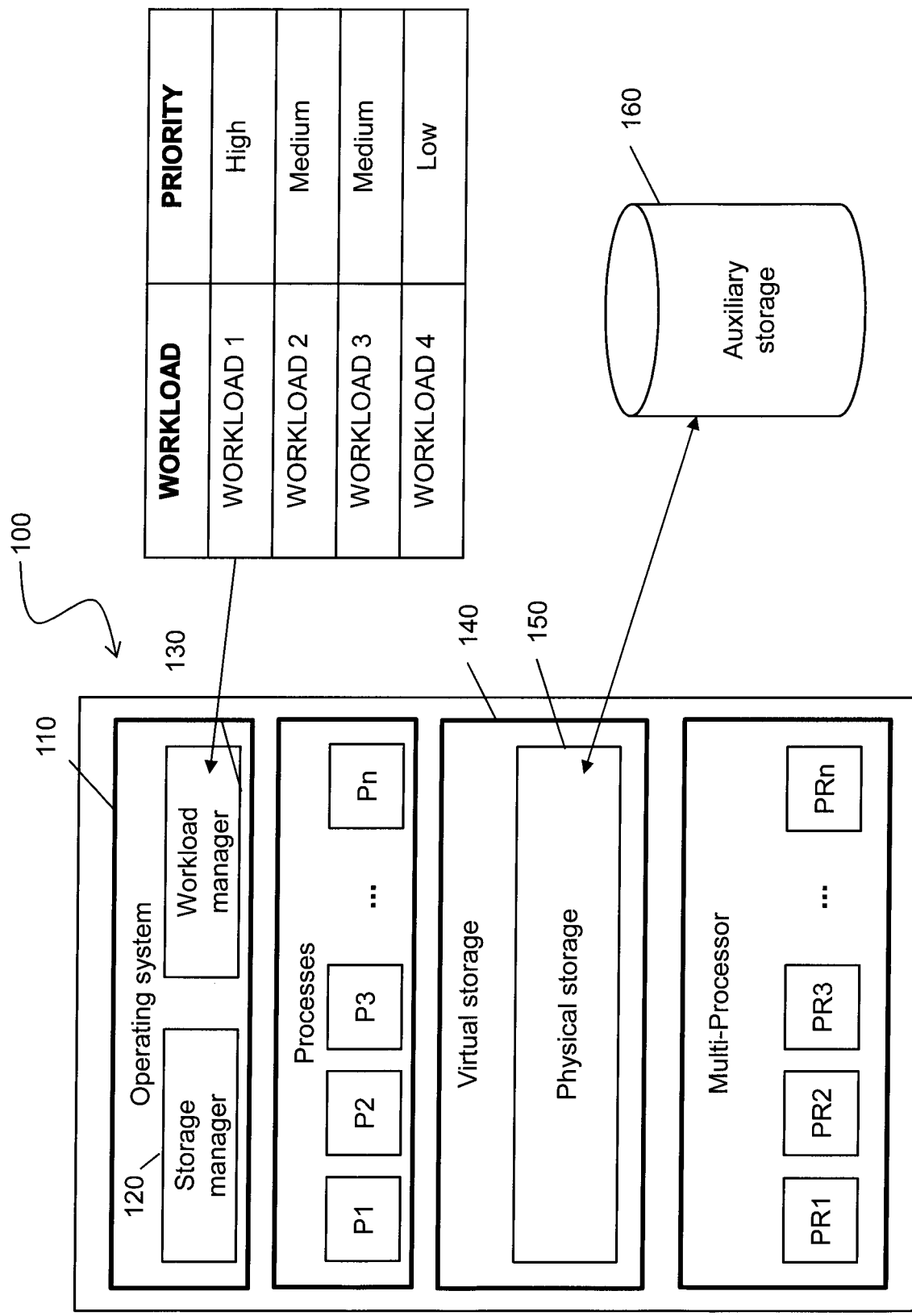
FIG. 1 schematically illustrates a computer system configured to perform a priority-driven page replacement process in accordance with one or more aspects of the present invention.

As noted, in one aspect, a computer-implemented method for memory management is provided. The memory management includes a page replacement process managed by a storage manager and a workload manager. The page replacement process swaps out the content associated with a frame of the physical memory to an auxiliary storage in order to provide a free frame. The method includes: determining that the physical memory runs out of free frames; providing priority information from the workload manager to the storage manager, the priority information indicating the priority or business relevance of a certain process; selecting one or more pages to be swapped to the auxiliary storage based on the priority information; and swapping out the content of the one or more selected page to the auxiliary storage.

According to a further aspect, a computer system comprising a memory management entity is disclosed. The memory management entity includes a page replacement mechanism managed by a storage manager and a workload manager. The page replacement mechanism is adapted to swap out the content associated with a frame of the physical memory to an auxiliary storage in order to provide a free frame. The computer system is further adapted to: determine that the physical memory runs out of free frames; provide priority information from the workload manager to the storage manager, the priority information indicating the priority or business relevance of a certain process; select one or more pages to be swapped out to the auxiliary storage based on the priority information; and swap out the content of the one or more selected page to the auxiliary storage.

According to a further aspect, a computer program product for memory management is provided. The computer program product comprises a computer readable storage medium having program instructions embodied therewith, the program instructions executable by a processor to cause the processor to execute a method according to the above-mentioned aspect.

By way of further example, the present invention may also include the following example features:

According to an example of the page replacement method, the storage manager may request the priority information from the workload manager after determining that the physical memory runs out of free physical frames. Thereby, the storage manager triggers the provision of priority information from the workload manager. According to other embodiments, the workload manager may provide the priority information in advance (e.g. in regular intervals or triggered by a newly executed process).

According to an example of the page replacement method, the request for providing priority information includes information regarding the number of pages to be swapped out. Thereby, the workload manager does not only know that a frame to be freed up is needed but the workload manager does also know the number of needed frames. Thereby, the workload manager can also provide instructions regarding a spreading of page replacement over multiple low-prioritized processes.

According to an example of the page replacement method, the workload manager provides a list including one or more processes with corresponding priority information. Thereby, priority information of a plurality of processes can be provided to the storage manager.

According to an example of the page replacement method, the list comprises multiple processes with corresponding priority information and information regarding the number of pages to be swapped out from each process. Thereby, the storage manager is instructed regarding a spreading of page replacement over multiple processes in order to reduce the impact of page replacement for a single low-prioritized process.

According to an example of the page replacement method, the storage manager selects certain pages to be swapped out based on priority information provided by the workload manager and performs the swapping out of selected pages. In other words, either the workload manager may directly instruct the storage manager regarding the process(es) from which the frame(s) should be stolen or the storage manager decides for itself from which process(es) the frame(s) are stolen.

According to an example of the page replacement method, in case that multiple pages have to be swapped out, the pages to be swapped out are spread over multiple low-prioritized processes. Thereby, the throughput of low important workload is evenly reduced and the impact for a single low-prioritized process is reduced.

According to an example of the page replacement method, the multiple low-prioritized processes are categorized in the lowest priority level or in different low-level priorities. For example, the spreading may be distributed over two or more priority levels at the lower end of the priority bandwidth. In addition, a weighting may be performed wherein the lowest priority level may be over-weighted. In other words, the storage manager or the workload manager takes the decision regarding the spreading of pages to be swapped out over multiple low-prioritized processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a schematic representation of an exemplary computer system 100. The computer system 100 comprises an operating system 110 including a storage manager 120 (in the present example also referred to as real storage manager) and a workload manager 130. The storage manager 120 may be configured to handle a memory management scheme using virtual storage 140 and physical storage 150. For example, the storage manager 120 may be configured to handle a paging mechanism in order to let programs exceed the size of available main memory, in the following referred to as physical storage 150. The computer system 100 may be a multiprocessor system comprising multiple processors PR1, PR2, . . . , PRn in order to process multiple processes P1, P2, . . . Pn simultaneously.

Paging is a well-known mechanism of virtual storage management in computer systems by which a computer stores and retrieves data from auxiliary storage 160 for use in physical storage 150. Data and/or program sections are swapped from the physical storage 150 to auxiliary storage 160 (e.g. hard disk) using fixed entities called pages. Thereby, the whole address space of the virtual storage 140 is segmented in logical sections (pages). The pages are associated with a certain address which is available in the physical storage. In the case of running a certain program, at least those pages associated with the program are transferred to physical storage which are currently required for running the program. Thereby, programs can be executed comprising an amount of data which exceeds the size of physical storage 150.

In computer systems with virtual memory management page replacement, in the following also referred to as stealing, takes place when no physical frame in the physical storage 150 is available in order to be covered by a content of a page to be loaded into physical storage 150. The stealing process swaps or pages the content of a frame to auxiliary storage, to free up the frame for further usage. A page replacement protocol makes the decision as to which frame gets stolen. Prior art page replacement processes try to find the frame which is associated with the lowest probability of usage in the near future. In other words, one or more frames are investigated which are optimal to be swapped out to the auxiliary storage because they will not be needed in the near future and therefore will not be reloaded into physical storage soon.

Modern computer system have a huge amount of physical memory, so page replacement processes which try to find the "optimal" frame require significant system resources for determining the "optimal" frame. Some of the page replacement processes permanently require some system resources, even if the system has mostly enough frames. In other words, known page replacement approaches are no longer effective in modern computer systems with a huge amount of physical storage because the expenditure for finding the optimal page is out of proportion to the obtained benefit.

In contrast, the approach of the present disclosure is to select a frame to be swapped out based on the business importance or priority of the process, the frame belongs to. In other words, the workload of the computer system may be classified in two or more priority classes indicating the importance of the workload and the priority classes are used to select one or more frames for swapping out their content to the auxiliary storage 160.

Referring again to FIG. 1, the workload manager 130 may be adapted to assign system resources (processor, storage resources etc.) to certain processes handled by the computer system 130. In order to perform the system resource assignment, the workload manager 130 has knowledge regarding the importance or priority of the processes. For example, the importance or priority of a certain process is stored in a control block associated with the process. So, in a broader sense, by means of the workload manager 130, the operating system 110 may already have the knowledge regarding the importance/priority of a certain process. The importance/priority level may be assigned to the respective process when entering the computer system 100, i.e. at the start or before starting the process. The importance/priority level may be assigned to the process by the workload manager 130 using a certain policy. The policy may reflect the importance of the respective process for the customer. The importance/priority information can also be used to find a frame which is the best candidate for page replacement.

Thereby, high prioritized processes may be not affected by page replacements, i.e., no or essentially no frames of high prioritized processes are swapped out to the auxiliary storage but only frames of low-prioritized frames are selected by the page replacement algorithm.

FIG. 1 shows a table indicating the association of a priority levels to a certain workload (e.g. a certain process). As mentioned before, the priority level may be derived from control blocks provided by the workload manager or a similar workload handling entity. For example, workload 1 may have high priority, workload 2 and workload 3 may have medium priority and workload 4 may have low priority. So, using the information, the page replacement process may select a frame of workload 4 because the workload is less important (according to the metric used for determining the priority level) than the other ones. The storage manager 120 may be responsible for stealing pages from the virtual storage 140 and move the content of the frame associated with the page (stored in physical storage 150) to auxiliary storage 160.

Figure 2:
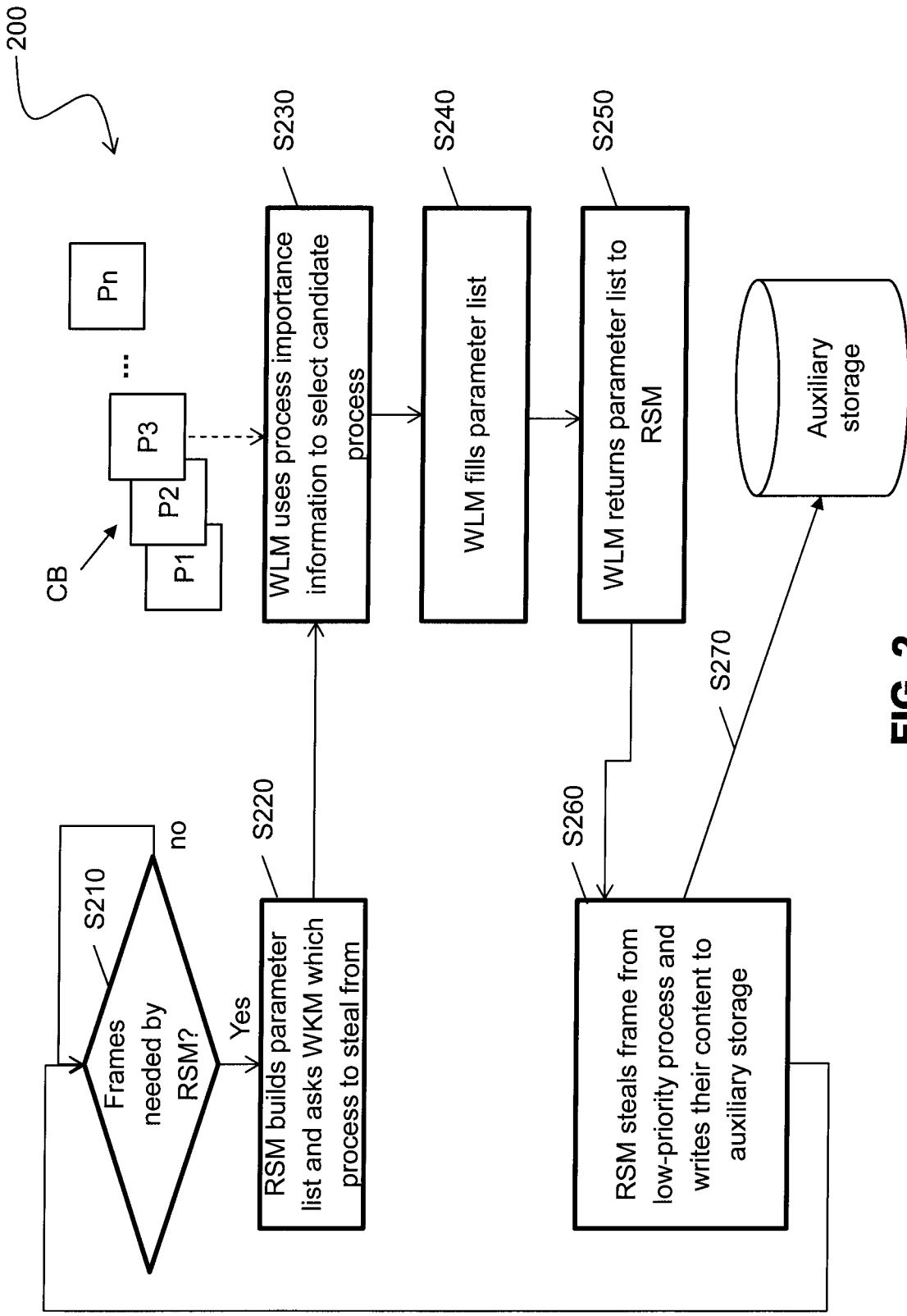
FIG. 2 illustrates one embodiment of a method for performing a priority-driven page replacement process in accordance with one or more aspects of the present invention.

FIG. 2 shows a flow chart of one embodiment of the page replacement process 200 in order to select a certain frame based on the above-noted workload priority metric. Referring collectively to FIGS. 1 & 2, at the beginning, the storage manager 120 may detect that no free frames are available in the physical storage 150 (S210). For example, a process may request a further page from the virtual storage 140 but storage manager 120 cannot back the requested further page with a frame of the physical storage 150. Thus, a page replacement has to be performed in order to provide a free frame. In other words, the storage manager 120 may have to steal a page from virtual storage 140 in order to provide a free frame.

Continuing, the storage manager 120 may ask the workload manager (WLM) 130 from which process a page should be stolen (S220). For instance, the storage manager 120 transmits a request to the WLM 130 for providing priority information for the currently running processes. In case that multiple pages are required to be stolen, the storage manager 120 may transmit a parameter list to the WLM 130 indicating the number of pages to be stolen. The request for providing priority information, respectively, the parameter list may be transmitted to the WLM 130 using the workload manager API (application programming interface).

After receiving the request at the WLM 130, the WLM 130 uses available process importance/priority information to select one or more candidate process (S230). For example, WLM 130 may use control blocks CB associated with processes P1-Pn to determine the candidate process(es). Depending on the number of pages to be stolen and depending on the distribution of priorities associated with the current running processes, the WLM 130 may use a certain methodology for determining the candidate process(es). In case of a single page to be stolen, the WLM 130 may select the process with the lowest priority. However, in case that multiple pages have to be stolen, the WLM 130 may spread the pages to be stolen over multiple low-prioritized processes. The low-prioritized processes may all have the lowest priority level or may have different priority levels at the lower end of the priority range. For example, the pages may mainly be stolen from low prioritized processes and, to a lesser extent, also from processes which are slightly higher prioritized than the lowest prioritized processes. Thereby, the overall throughput of low priority workload is reduced evenly. In addition, the WLM 130 may consider prior decisions for selecting low-priority processes in order to avoid unreasonable stealing from certain low-priority processes. According to other embodiments, the WLM 130 may only provide information regarding the importance/priority of processes, and the selection of candidate process(es), respectively, and the distribution of multiple pages to be stolen over multiple low-prioritized processes, may be performed by the storage manager 120.

After selecting one or more candidate processes, the WLM 130 may include certain entries into the parameter list in order to instruct the storage manager 120 from which process(es) the frame should be stolen (S240). The parameter list may at least include information regarding the importance/priority of the currently running processes, the distribution of frames to be stolen over multiple low-priority processes, etc. For instance, the parameter list may include instructions regarding how may frames should be stolen from certain frames. The instructions may contain the exact number of frames or a percentage associated with certain frames. As such, the storage manager 120 is able to steal frames of one or more low-priority processes.

After finalizing the parameter list, the parameter list is transmitted from the WLM 130 to the storage manager 120 (S250). The transmission may be performed through the WLM API.

After receiving the priority information at the storage manager 120, the storage manager 120 may steal one or more frames from low-priority processes (S260) and may swap the content of the frames to auxiliary storage (S270). Thereby, high-prioritized processes are not or essentially not affected by the page replacement method.

The page replacement process may return to its idle state, i.e. may wait until a further page is requested which cannot be backed with a real frame. If so, the process may start from the beginning.

Summing up, a priority based page replacement process is described herein which does not investigate the best frame to be selected based on the probability of usage of the frame in near future, but rather based on priority of the process the frame belongs to. The method is advantageous because improved throughput for high-prioritized workload is obtained and the overhead for detecting the optimal candidate frame for page replacement can be significantly reduced.

The invention claimed is:

1. A computer-implemented method for memory management, the memory management including a page replacement process managed by a storage manager and a workload manager, the page replacement process swapping out a plurality of pages associated with processes to an auxiliary storage in order to provide free frames, wherein each page of the plurality of pages is associated with a frame of physical memory, the method comprising:

before starting each process of a plurality of processes, assigning priority information to the process upon entry of the process into a computer system comprising the storage manager and the workload manager;

storing the priority information of each process of the plurality of processes in a control block associated with the process;

determining, by the storage manager, that the physical memory runs out of free frames;

triggering, based on the determining that the physical memory runs out of free frames, by the storage manager, the workload manager, to provide priority information to the storage manager, wherein the triggering comprises transmitting, to the workload manager, a parameter list indicating a number of pages to be swapped to auxiliary storage to generate free frames;

based on the triggering, selecting, by the workload manager, candidate processes, based on determining a priority of the candidate processes, and populating the candidate processes in the parameter list, the determining the priority of the candidate processes comprising:

determining, by the workload manager, the priority information for each process of the plurality of processes by referencing the priority information stored in the control block associated with the process, the priority information for the process indicating a priority level indicating a business relevance of the process and an importance of the process for a given customer, wherein for each process of the plurality of processes, the priority level of the process is selected from the group consisting of a high priority level, a medium priority level, and a low priority level, wherein for each process of the plurality of processes, the priority level of the process is not related to a probability of future usage of a frame associated with the process;

selecting, by the workload manager, the candidate processes, wherein the candidate processes comprise a portion of the plurality of processes of the low priority level and comprise a low priority workload; and updating, by the workload manager, the parameter list to comprise instructions to instruct the storage manager to free a certain portion of frames, the certain portion comprising more than one frame, wherein the certain portion of frames is associated with the candidate processes, wherein the instructions comprise an exact number of frames of the certain portion or a percentage of frames of the certain portion, and wherein the instructions direct the storage manager to spread page replacement over the candidate processes;

transmitting, by the workload manager, the parameter list to the storage manager;

based on receiving the parameter list provided by the workload manager, selecting, by the storage manager, a given plurality of pages utilized by the candidate processes to be swapped out to the auxiliary storage to free the exact number of frames of the certain portion or the percentage of frames of the certain portion, wherein a quantity of the exact number of frames of the certain portion or the percentage of frames of the certain portion is the number of pages in the parameter list, wherein the auxiliary storage comprises a hard disk, wherein the selecting reduces an overall throughput of the low priority workload; and swapping out, by the storage manager, processes of the low priority level comprising the selected given plurality of pages to the auxiliary storage, wherein processes of the medium priority level and processes of the high priority level are not affected by the swapping out.

2. The computer-implemented method of claim 1, wherein the updated parameter list provided by the comprises corresponding priority information for each process of the plurality of processes.

3. The computer-implemented method of claim 2, wherein the updated parameter list comprises multiple processes with corresponding priority information and information regarding a number of pages to be swapped out from each process of the plurality of processes.

4. The computer-implemented method of claim 1, further comprising:

waiting, by the storage manager, in an idle state, until a further page is requested by the workload manager which cannot be backed by a real frame.

5. A computer system for memory management, the computer system comprising:

a memory; and a processor communicatively coupled to the memory, wherein the computer system performs a method comprising:

before starting each process of a plurality of processes, assigning priority information to the process upon entry of the process into a computer system comprising a storage manager and a workload manager;

storing the priority information of each process of the plurality of processes in a control block associated with the process;

determining, by the storage manager, that the physical memory runs out of free frames, wherein the memory management includes a page replacement process managed by the storage manager and the workload manager, the page replacement process swapping out a plurality of pages associated with processes to an auxiliary storage in order to provide free frames, wherein each page of the plurality of pages is associated with a frame of physical memory;

triggering, based on the determining that the physical memory runs out of free frames, by the storage manager, the workload manager, to provide priority information to the storage manager, wherein the triggering comprises transmitting, to the workload manager, a parameter list indicating a number of pages to be swapped to auxiliary storage to generate free frames;

based on the triggering, selecting, by the workload manager, candidate processes, based on determining a priority of the candidate processes, and populating the candidate processes in the parameter list, the determining the priority of the candidate processes comprising:

determining, by the workload manager, the priority information for each process of the plurality of processes by referencing the priority information stored in the control block associated with the process, the priority information for the process indicating a priority level indicating a business relevance of the process and an importance of the process for a given customer, wherein for each process of the plurality of processes, the priority level of the process is selected from the group consisting of a high priority level, a medium priority level, and a low priority level, wherein for each process of the plurality of processes, the priority level of the process is not related to a probability of future usage of a frame associated with the process;

selecting, by the workload manager, the candidate processes, wherein the candidate processes comprise a portion of the plurality of processes of the low priority level and comprise a low priority workload; and updating, by the workload manager, the parameter list to comprise instructions to instruct the storage manager to free a certain portion of frames, the certain portion comprising more than one frame, wherein the certain portion of frames is associated with the candidate processes, wherein the instructions comprise an exact number of frames of the certain portion or a percentage of frames of the certain portion, and wherein the instructions direct the storage manager to spread page replacement over the candidate processes;

transmitting, by the workload manager, the parameter list to the storage manager;

based on receiving the parameter list provided by the workload manager, selecting, by the storage manager, a given plurality of pages utilized by the candidate processes to be swapped out to the auxiliary storage to free the exact number of frames of the certain portion or the percentage of frames of the certain portion, wherein a quantity of the exact number of frames of the certain portion or the percentage of frames of the certain portion is the number of pages in the parameter list, wherein the auxiliary storage comprises a hard disk, wherein the selecting reduces an overall throughput of the low priority workload; and swapping out, by the storage manager, processes of the low priority level comprising the selected given plurality of pages to the auxiliary storage, wherein processes of the medium priority level and processes of the high priority level are not affected by the swapping out.

6. The computer system of claim 5, wherein the updated parameter list comprises corresponding priority information for each process of the plurality of processes.

7. The computer system of claim 6, wherein the updated parameter list comprises multiple processes with corresponding priority information and information regarding a number of pages to be swapped out from each process of the plurality of processes.

8. The computer system of claim 5, further comprising:
waiting, by the storage manager, in an idle state, until a further page is requested by the workload manager which cannot be backed by a real frame.

9. A computer program product for memory management, the computer program product comprising:
a non-transitory computer readable storage medium having program instructions embodied therewith, the program instructions being executable by a processor to perform a method comprising:
before starting each process of a plurality of processes, assigning priority information to the process upon entry of the process into a computer system comprising a storage manager and a workload manager;
storing the priority information of each process of the plurality of processes in a control block associated with the process;
determining, by the storage manager, that the physical memory runs out of free frames, wherein the memory management includes a page replacement process managed by the storage manager and the workload manager, the page replacement process swapping out a plurality of pages associated with processes to an auxiliary storage in order to provide free frames, wherein each page of the plurality of pages is associated with a frame of physical memory;
triggering, based on the determining that the physical memory runs out of free frames, by the storage manager, the workload manager, to provide priority information to the storage manager, wherein the triggering comprises transmitting, to the workload manager, a parameter list indicating a number of pages to be swapped to auxiliary storage to generate free frames;
based on the triggering, selecting, by the workload manager, candidate processes, based on determining a priority of the candidate processes, and populating the candidate processes in the parameter list, the determining the priority of the candidate processes comprising:
determining, by the workload manager, the priority information for each process of the plurality of processes by referencing the priority information stored in the control block associated with the process, the priority information for the process indicating a priority level indicating a business relevance of the process and an importance of the process for a given customer, wherein for each process of the plurality of processes, the priority level of the process is selected from the group consisting of a high priority level, a medium priority level, and a low priority level, wherein for each process of the plurality of processes, the priority level of the process is not related to a probability of future usage of a frame associated with the process;
selecting, by the workload manager, the candidate processes, wherein the candidate processes comprise a portion of the plurality of processes of the low priority level and comprise a low priority workload; and
updating, by the workload manager, the parameter list to comprise instructions to instruct the storage manager to free a certain portion of frames, the certain portion comprising more than one frame, wherein the certain portion of frames is associated with the candidate processes, wherein the instructions comprise an exact number of frames of the certain portion or a percentage of frames of the certain portion, and wherein the instructions direct the storage manager to spread page replacement over the candidate processes;
transmitting, by the workload manager, the parameter list to the storage manager;
based on receiving the parameter list provided by the workload manager, selecting, by the storage manager, a given plurality of pages utilized by the candidate processes to be swapped out to the auxiliary storage to free the exact number of frames of the certain portion or the percentage of frames of the certain portion, wherein a quantity of the exact number of frames of the certain portion or the percentage of frames of the certain portion is the number of pages in the parameter list, wherein the auxiliary storage comprises a hard disk, wherein the selecting reduces an overall throughput of the low priority workload; and
swapping out, by the storage manager, processes of the low priority level comprising the selected given plurality of pages to the auxiliary storage, wherein processes of the medium priority level and processes of the high priority level are not affected by the swapping out.

10. The computer program product of claim 9, wherein the updated parameter list comprises corresponding priority information for each process of the plurality of processes.

11. The computer program product of claim 9, further comprising:
waiting, by the storage manager, in an idle state, until a further page is requested by the workload manager which cannot be backed by a real frame.

* * * * *